United States Patent
Schulak et al.

(10) Patent No.: US 7,032,649 B2
(45) Date of Patent: *Apr. 25, 2006

(54) ENERGY TRANSFER SYSTEM FOR COLD STORAGE FACILITIES

(75) Inventors: Edward R. Schulak, 567 Aspen, Birmingham, MI (US) 48009; J. Benjamin Horvay, Isle of Palms, SC (US)

(73) Assignee: Edward R. Schulak, Birmingham, MI (US)

( * ) Notice: Subject to any disclaimer, the term of this patent is extended or adjusted under 35 U.S.C. 154(b) by 700 days.

This patent is subject to a terminal disclaimer.

(21) Appl. No.: 10/298,501

(22) Filed: Nov. 18, 2002

(65) Prior Publication Data

US 2003/0121641 A1 Jul. 3, 2003

Related U.S. Application Data

(63) Continuation-in-part of application No. 09/611,141, filed on Jul. 6, 2000, now Pat. No. 6,484,794.

(51) Int. Cl.
F25B 29/00 (2006.01)

(52) U.S. Cl. ............................ 165/45; 165/53; 165/48.1
(58) Field of Classification Search .................. 165/45, 165/48.1, 50, 53, 61; 62/259, 260
See application file for complete search history.

(56) References Cited

U.S. PATENT DOCUMENTS

| 2,559,868 | A | * | 7/1951 | Gay | 165/45 |
|---|---|---|---|---|---|
| 3,782,132 | A | * | 1/1974 | Lohoff | 165/45 |
| 4,013,120 | A | * | 3/1977 | Rheinheimer | 165/48.1 |
| 4,250,957 | A | * | 2/1981 | McClendon | 165/45 |
| 4,257,239 | A | * | 3/1981 | Partin et al. | 62/238.7 |
| 4,281,495 | A | * | 8/1981 | Lee | 52/584.1 |
| 4,457,214 | A | * | 7/1984 | DeVries | 454/255 |
| 4,993,483 | A | * | 2/1991 | Harris | 165/45 |
| 5,394,935 | A | * | 3/1995 | Glover | 165/45 |
| 5,816,063 | A | * | 10/1998 | Schulak et al. | 62/238.6 |

* cited by examiner

Primary Examiner—Henry Bennett
Assistant Examiner—Tho V Duong
(74) Attorney, Agent, or Firm—Harness, Dickey & Pierce, P.L.C.

(57) ABSTRACT

A cold storage facility energy transfer system has a building which includes walls, a roof, and a floor. The building defines an enclosed space, which is to be cooled. A cooling system, which includes a compressor, a condenser, and an evaporator, is provided to cool the air within the enclosed space of the building. A ground water heat transfer mechanism reduces the operating temperature of the cooling system and raises the temperature of the building floor. A heat exchange mechanism draws heat from the compressor and the condenser to reduce operating temperature of the condenser and/or compressor. The heat exchange mechanism includes a mechanism associated with an area adjacent to the building floor for maintaining that area at a temperature so that underfloor icing is prohibited. An additional objective of the system reduces the temperature of the walls and roof of the building, reducing heat loss and improving the energy efficiency of the building.

12 Claims, 8 Drawing Sheets

ENERGY TRANSFER SYSTEM FOR COLD STORAGE FACILITIES

CROSS REFERENCE TO RELATED APPLICATIONS

This is a continuation-in-part of U.S. patent application Ser. No. 09/611,141, filed Jul. 6, 2000. Now U.S. Pat. No. 6,484,794.

BACKGROUND AND SUMMARY OF THE INVENTION

The present invention relates to cold storage facilities and, more particularly, to energy transfer systems for maintaining the floor of a cold storage facility at a desired temperature to eliminate underfloor icing and for reducing the operating temperature of the condenser and/or compressor in the cooling system and for cooling the exterior of the building.

Cold storage facilities are utilized in many different industries for storing perishable items such as meat, dairy products, vegetables or the like. Some of these applications require the temperature within the facility to remain well below zero degrees Fahrenheit such as for the storage of ice cream or ice. In these facilities, it is possible that the floor, which is ordinarily concrete, may freeze. In the event the floor becomes frozen, if water or the like is underneath the floor, it is possible for the water to form into ice. This is known as underfloor icing which, as the ice expands, may cause heaving of the floor or columns, which hold the building together.

To alleviate underfloor icing problem, electric heating coils have been used to warm the floor to prohibit the underfloor ice. Also, some installations may utilize air ducts or pipes through which a liquid is recirculated. All of these systems require a significant amount of energy in order to provide a desired heating function to maintain the temperature under the floor at a desired level.

It is an object of the present invention to provide an energy transfer system which significantly reduces the energy required to maintain the fluid temperature of a circulating fluid in a piping system to prevent underfloor icing and which also reduces the energy consumption of the cooling system by lowering the condensing temperature. The present invention provides the art with an energy transfer system which utilizes the heat created by the ground, standing well, open well or body of water and the cooling system (condenser/compressor) in order to heat the fluid passed through the piping system. The present invention includes a fluid which withdraws heat from a heat exchanger in the ground prior to entering the condenser and/or compressor where a second heat exchanger also withdraws additional heat. Alternatively, water at desired temperatures can be drawn from a standing well, open well or body of water and used as the fluid. The heated fluid then passes under the floor into a piping grid to warm the space beneath the floor. Additional heating, from a source such as a gas boiler or electric heat pump, may be required to heat the fluid during periods when heat from the cooling system and ground is insufficient.

An additional objective of the present invention is to provide an energy transfer system which reduces the energy required during summer operation (or in a warm climate year round) to cool the building. This is accomplished by using the previously described ground heat exchanger or standing well, open well or body of water to reject heat from the fluid into the ground or water prior to entering the building walls and roof where heat gained from the ambient surroundings is absorbed by the fluid in the piping circuit passing through the walls and roof.

Additional objects and advantages of the present invention will become apparent from the detailed description of the preferred embodiment, and the appended claims and accompanying drawings, or may be learned by practice of the invention.

DETAILED DESCRIPTION OF THE PREFERRED EMBODIMENT

Figure 1:
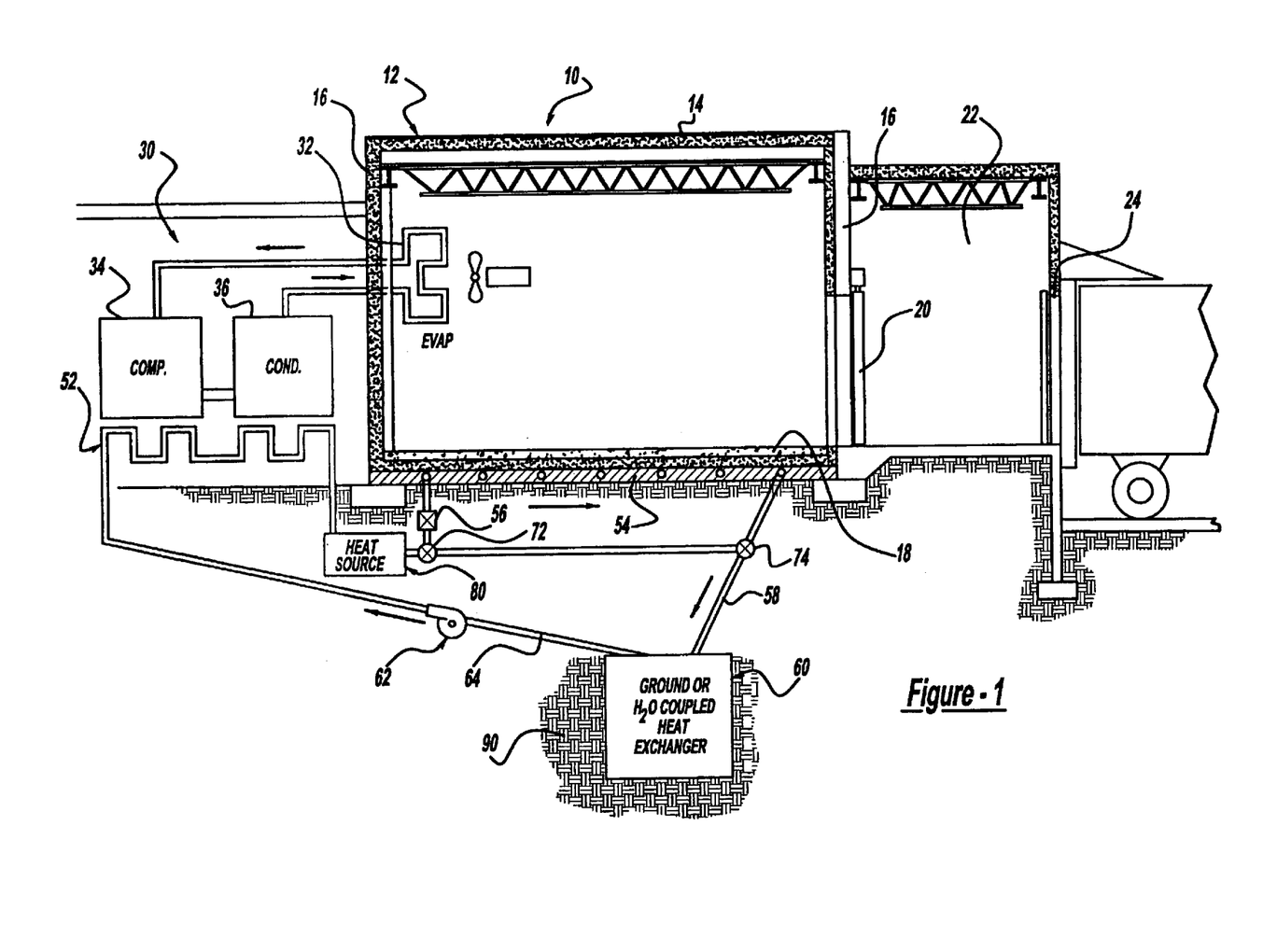
FIG. 1 is a schematic view of a cold storage facility energy transfer system in accordance with the present invention.

Turning to FIG. 1, an energy transfer system for a cold storage facility is illustrated and designated with the reference numeral 10. The cold storage facility 10 includes a building 12 which includes a roof 14 as well as walls 16 and a floor 18. The walls may include a door 20 which enables access into an additional storage room 22 which acts as a loading dock. The additional storage room 22 includes a door 24 which enables access to trucks which may be loaded with the frozen material inside of the cold storage building 12.

The building 12 includes a cooling system 30 which conditions the air within the building to maintain it at cold, freezing or below levels. Ordinarily, the cooling system 30 includes an evaporator 32 as well as a compressor 34 and condenser 36. The evaporator 32 is positioned within the building. The compressor 34 and condenser 36 are located outside of the building, either adjacent in a separate building or remote from the building 12. The compressor 34 and condenser 36 generate a substantial amount of heat due to the cooling load of the building 12.

Condenser 36, and heat source 80, acts as a heat source for the fluid underneath the floor 18. The fluid increases the temperature under the floor so that underfloor icing does not occur. The process of gaining heat from the condenser 36 and/or compressor 34 also has the beneficial effect of reducing the condensing temperature of the cooling system 30. During summer operation, the ground heat exchanger 60 transfers heat from the fluid to the ground 90 to cool the fluid prior to the fluid passing through the exterior of the building 12.

The ground heat exchanger 60 transfers heat to and from the ground 90 to the fluid. From the ground heat exchanger 60, the fluid is pumped through conduit 64 by means of a pump 62 to a heat exchanger 52 which transfers heat from the condenser 36 and/or compressor 34 to the fluid. Accordingly, by withdrawing the heat, in turn, the operating temperature of the condenser 36 and/or compressor 34 is reduced. The fluid within heat exchanger 52 is then passed into a piping grid 54 which is in contact with the floor 18 of the building 12. The piping grid 54 may have several different valves enabling the fluid to pass through different areas (zones) or under the entire floor. Also, a thermostatic control 56 is present to control the temperature of the fluid passing into the piping grid 54. The fluid passing into the piping grid is at a desired temperature; preferably between fifty and seventy degrees Fahrenheit, to keep the area below the floor 18 free from underfloor ice. The thermostatic control 56 controls the inlet temperature to the piping grid 54 by regulating the amount of flow that can be diverted through valve 72 from the piping grid 54 if there is excess capacity and by regulating additional heating, supplied by heat source 80, to increase the fluid temperature, if insufficient. Heat source 80 may be a boiler or heat pump, and may be required to heat the fluid during periods when heat from the cooling system and ground is insufficient, it may be located above or below ground.

A conduit 58 is coupled with the piping grid 54 to pass the fluid to the ground coupled heat exchanger 60, where it again is recycled back into the heat exchanger 52. Valve 74 allows mixing of the fluid diverted from the piping grid 54.

Figure 2:
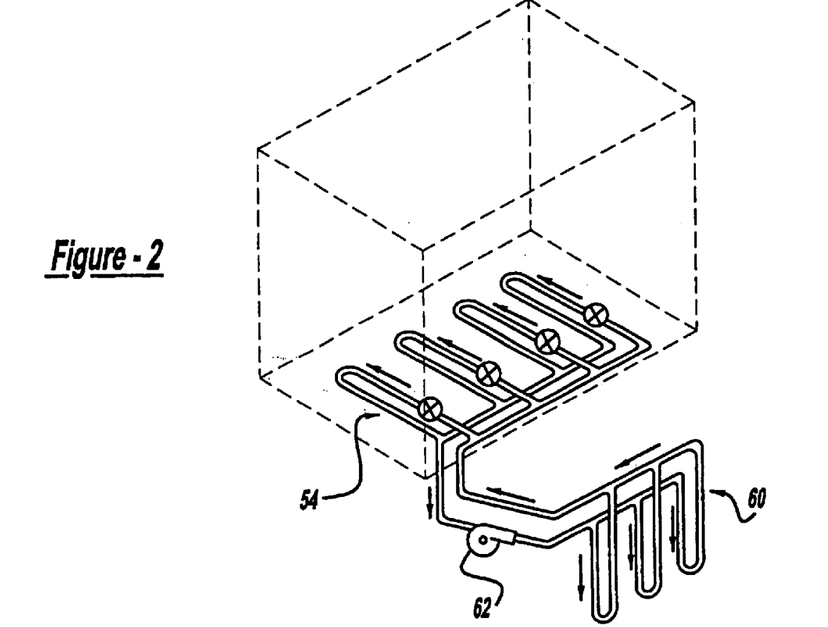
FIG. 2 is a schematic view of a piping grid for a cold storage facility.
Figure 3:
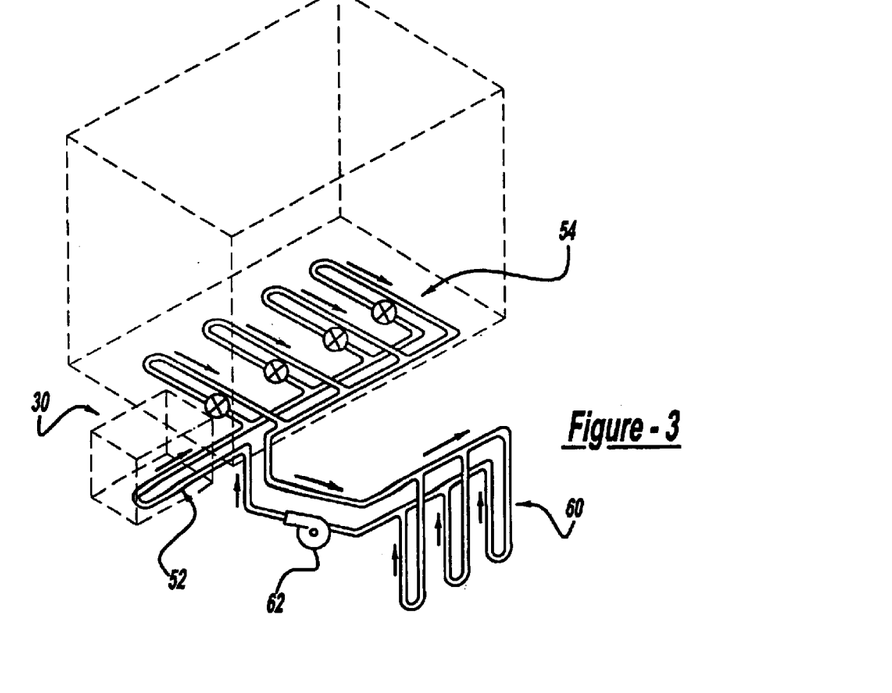
FIG. 3 is an additional schematic view of a piping grid for a cold storage facility.
Figure 4:
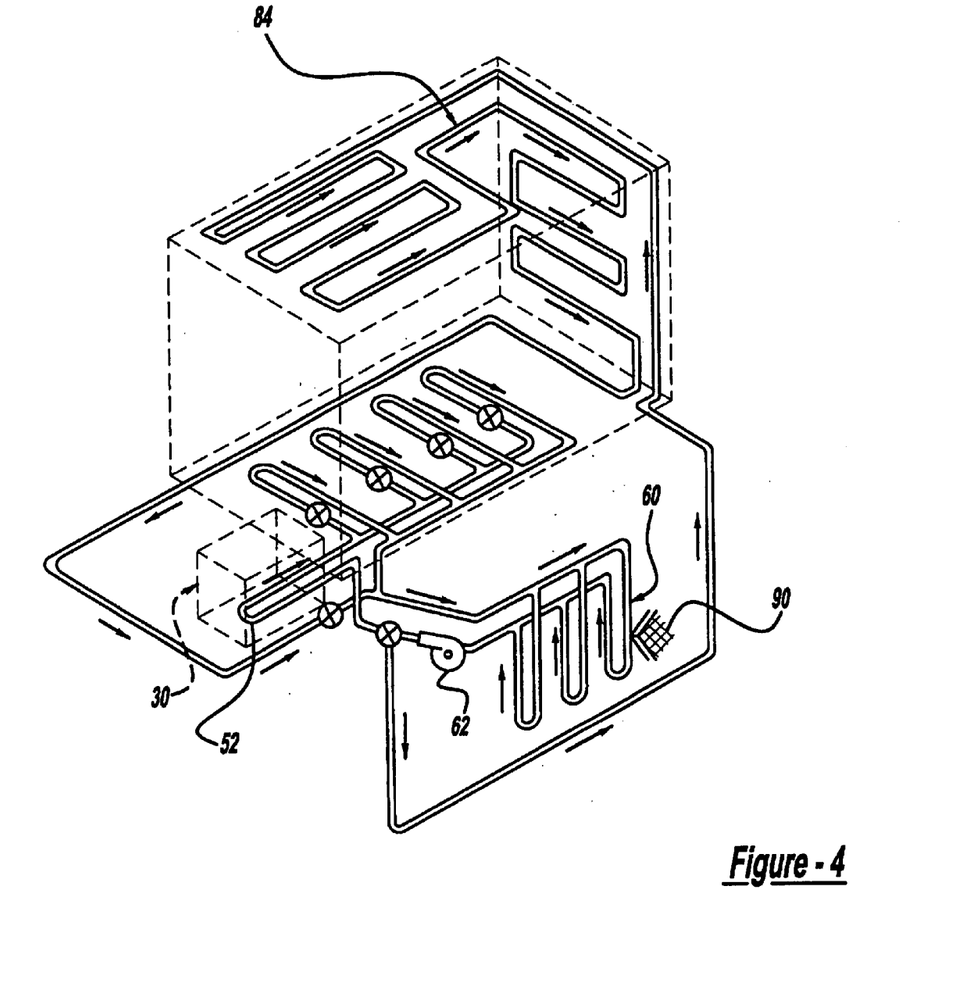
FIG. 4 is an additional schematic view of a piping grid for a cold storage facility.

Turning to FIGS. 2–4, a better understanding of the piping grid may be had. In FIG. 2, the piping grid 54 is illustrated underneath the floor. The conduit is coupled with the ground heat exchanger 60. Also, a pump 62 is illustrated for pumping the fluid between the heat exchanger and the floor. Each leg of the serpentine grid 54 may include a valve for controlling fluid in the leg which, in turn, controls the temperature of that portion of the floor.

FIG. 3 illustrates an additional piping grid. In the piping grid illustrated in FIG. 3, the serpentine grid 54 is illustrated underneath the floor. Also, the ground coupled heat exchanger 60 is present to receive the fluid. A pump is present to move the fluid from the heat exchanger 60 to the heat exchanger 52 adjacent to the compressor and condenser for cooling the compressor and/or condenser. The heat through conduction is passed from the compressor and condenser assembly to the fluid which, in turn, passes it into the piping grid underneath the floor to prevent the underfloor freezing and/or icing. Also, by passing the fluid adjacent to the compressor and condenser, this reduces the temperature of the compressor and condenser, increasing the efficiency of these components.

FIG. 4 shows an additional embodiment. Here, the piping system not only runs under the floor, but is contained in the walls as well as in the roof. During summer (or warm climate) operation, the ground heat exchanger 60 transfers heat from the fluid to the ground 90 to reduce the temperature of the fluid. Also, the conduit may pass adjacent to the compressor and condenser and returns to the ground coupled heat exchanger. The piping grid 84 illustrated in FIG. 4 would be utilized for summer operation. Here, the cooling effect of the ground coupling is used to reduce the compressor and condenser temperatures, and also to reduce the exterior temperature of the cold storage facility and reduce the energy required by the cooling system 30. Both of these operations contribute to reduce energy consumption of the cold storage facility. Under these conditions, the flow of the cooling fluid in the walls and roof could be returned directly to the ground coupled heat exchanger 60, and operate independent from the floor system.

The piping schemes illustrated in FIGS. 2 and 3 are utilized in winter (or cold climate) operations. In winter, the ground coupled fluid is utilized as a heat source wherein the heat rejected by the compressor and condenser assembly is also utilized to prevent underfloor icing. Further, in the summer operation, the ground heat exchanger acts as a heat sink, providing a cooling fluid to reduce the compressor and/or condenser pressures, as well as their temperature, and likewise the cooling fluid is passed around the walls and ceiling which reduces the temperature in the walls and ceiling and thereby the heat loss through the walls and ceiling which, in turn, enables less cooling to be used to maintain a given building temperature.

Accordingly, fluid is pumped from the ground heat exchanger 60 into the heat exchanger 52. Thermostatic control 56 regulates flow to the piping grid 54 to maintain the desired temperature. The temperature of fluid in the heat exchanger 52 increases as heat is transferred from the compressor and condenser into the fluid. This heated fluid, still under pressure of the pump, then passes into the piping grid 54 in contact with the floor 18 of the building 12. At that time, the space or area beneath the floor 18 is heated to maintain a temperature prohibiting ice formation underneath or on the floor. The fluid continues into the ground heat exchanger 60 where it is again recycled back into the heat exchanger 52.

By utilizing the heat generated by the compressor and the condenser, the present system reduces the energy consumption required to heat the area underneath the floor to prohibit underfloor icing. This system reduces energy consumption since the fluid is heated by both the ground and the compressor and condenser and the only power required to run the system is that need to run the pump or pumps to circulate fluid throughout the system. In addition, energy consumption of the cooling system is also reduced by lowering the condensing temperature.

Figure 5:
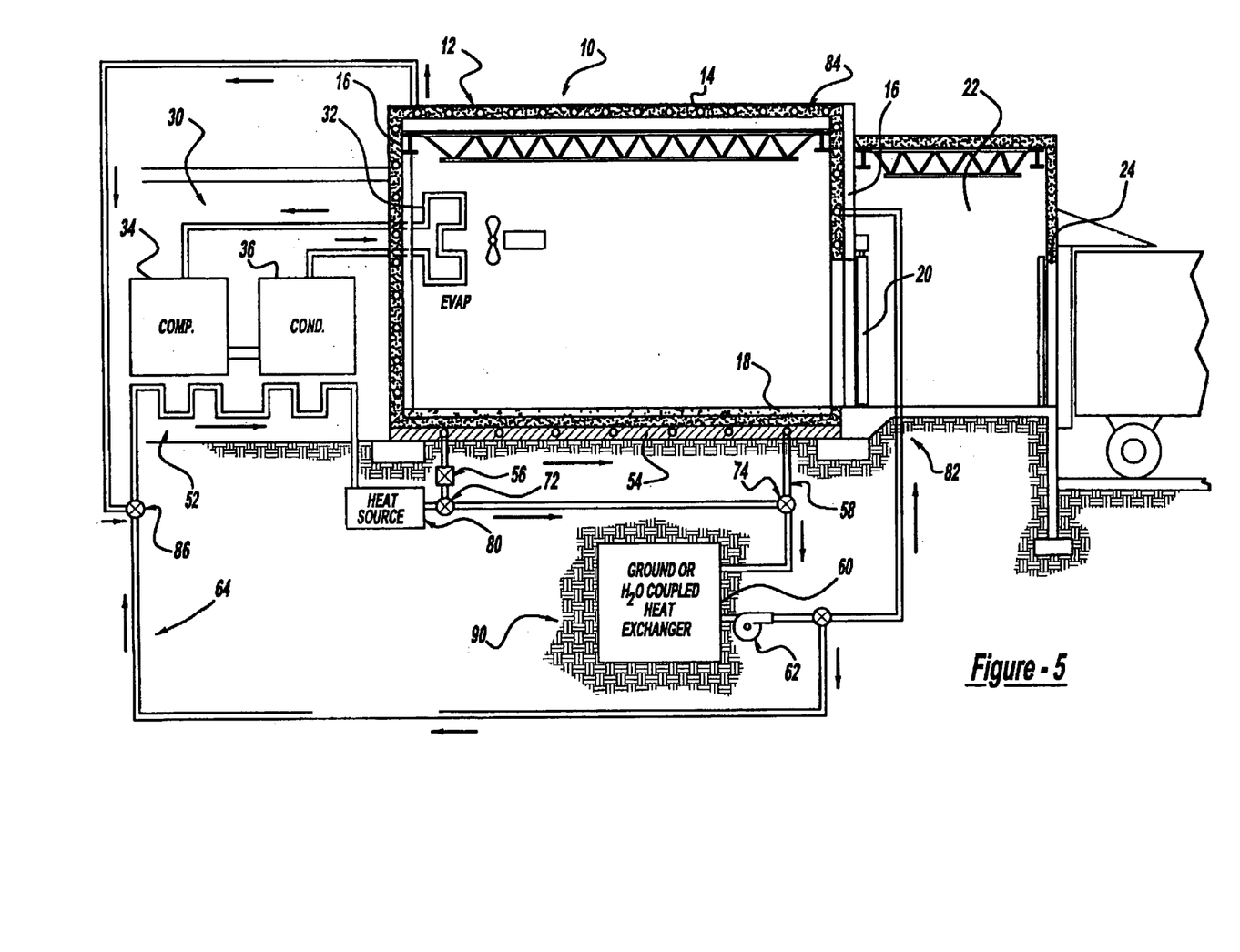
FIG. 5 is an additional schematic view of a cold storage facility energy transfer system in accordance with the present invention with summer cooling mode.

FIG. 5 illustrates an additional embodiment of the invention with like elements identified with the same reference numerals. During summer operation, the ground heat exchanger 60 transfers heat from the fluid to the subsurface ground or a body of water 90 to reduce the temperature of the fluid. From the ground heat exchanger 60, the fluid is pumped via conduit 82 throughout piping grid 84 located in the walls and roof of building 12 to cool the exterior of the building 12 to reduce the energy required by the cooling system 30 and the heat loss through the building walls and roof. From piping grid 84, the fluid passes through valve 86 by way of conduit 88 where it is mixed with any fluid from conduit 64. The fluid then cools the compressor and condenser and either returns directly to the ground coupled heat exchanger or the fluid then flows through the circuit to heat the floor 18, as required, in like manner as previously described.

By utilizing the heat generated by the ground 90, condenser 36 and/or compressor 34, and heat source, the present system reduces the energy consumption required to heat the area underneath the floor 18 to prohibit underfloor icing. In addition, energy consumption of the cooling system 30 is also reduced by lowering the condensing temperature. In addition, the system may be used to cool the exterior of the building 12 during summer operation or year-round in a warm or hot climate.

Figure 6:
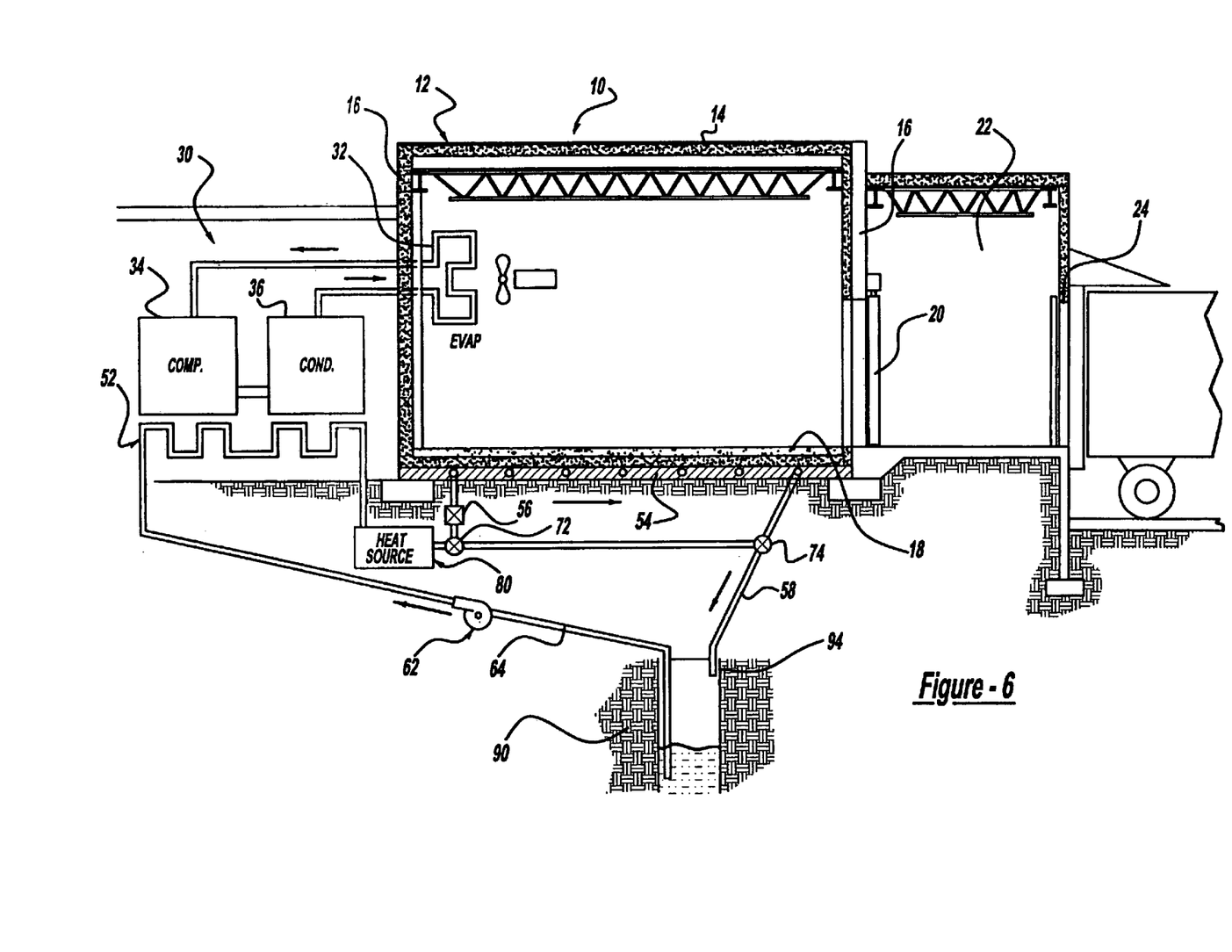
FIGS. 6 and 7 are schematic views like FIG. 1 utilizing a standing well and an open well or body of water.
Figure 7:
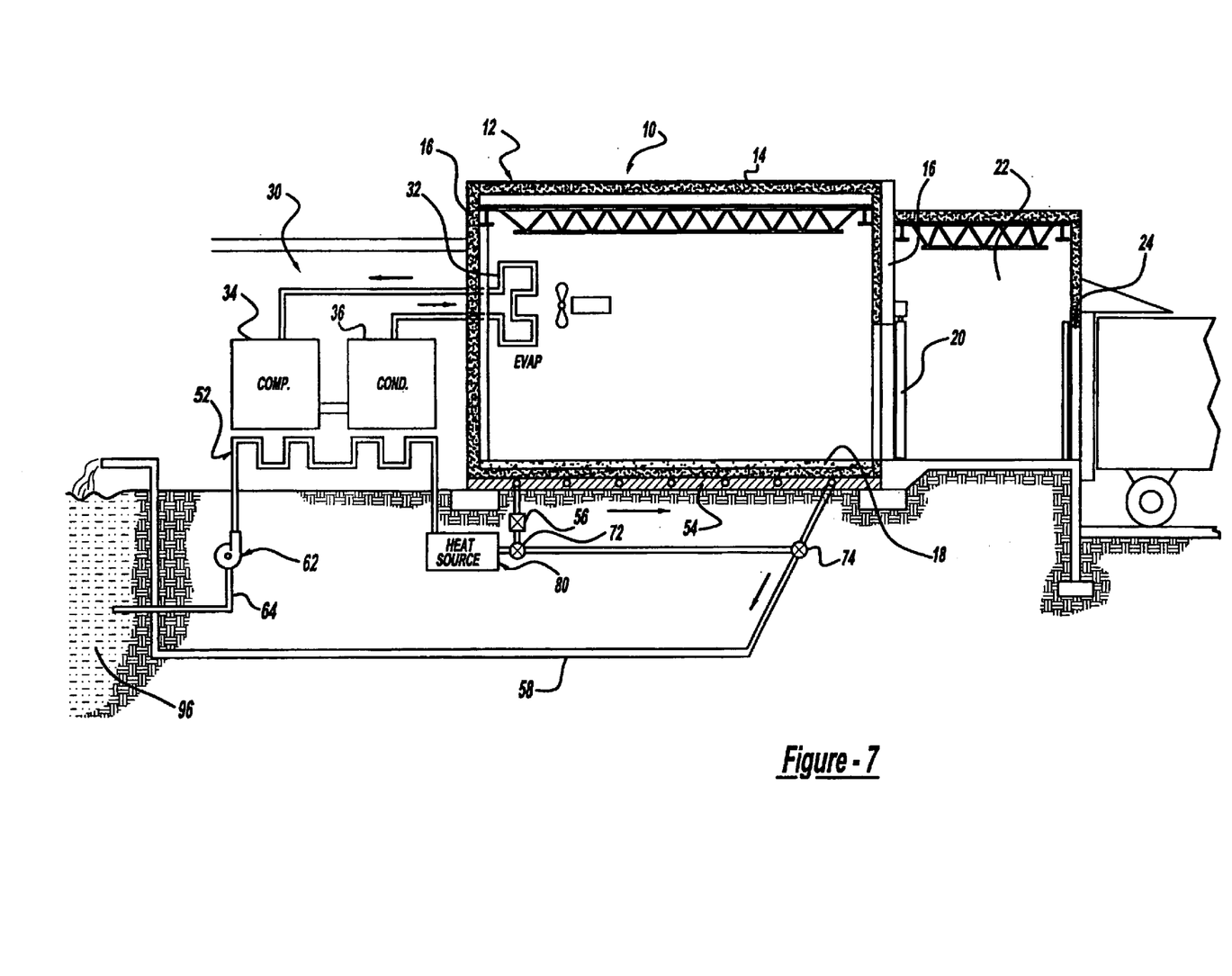

FIGS. 6 and 7 illustrate additional embodiments on the present invention. Like elements are identified with the same reference numerals.

In FIG. 6, a standing well is illustrated and designated with the reference numeral 94. The standing well 94 is drilled into the ground to provide a water source. Water is drawn by pump 62 via conduit 64 into the system. The conduit 64 is positioned deep inside the standing well so that the water drawn into the system is at a desired temperature of the ground at a lower level. Water returns to the well via conduit 58 and is deposited onto the surface of the well. Thus, this illustrates that a standing well may be utilized having a continuous supply of groundwater entering into the well 94.

Turning to FIG. 7, an open well or body of water is designated with the reference numeral 96. Here, the conduit 64 would be positioned into the open well or body of water 96 and the pump 62 would draw the water into the system. Likewise, conduit 58 would deposit the water back into the open well or body of water 96. The embodiments in FIGS. 6 and 7 enable the use of groundwater in the system when the sources of groundwater are readily available.

Figure 8:
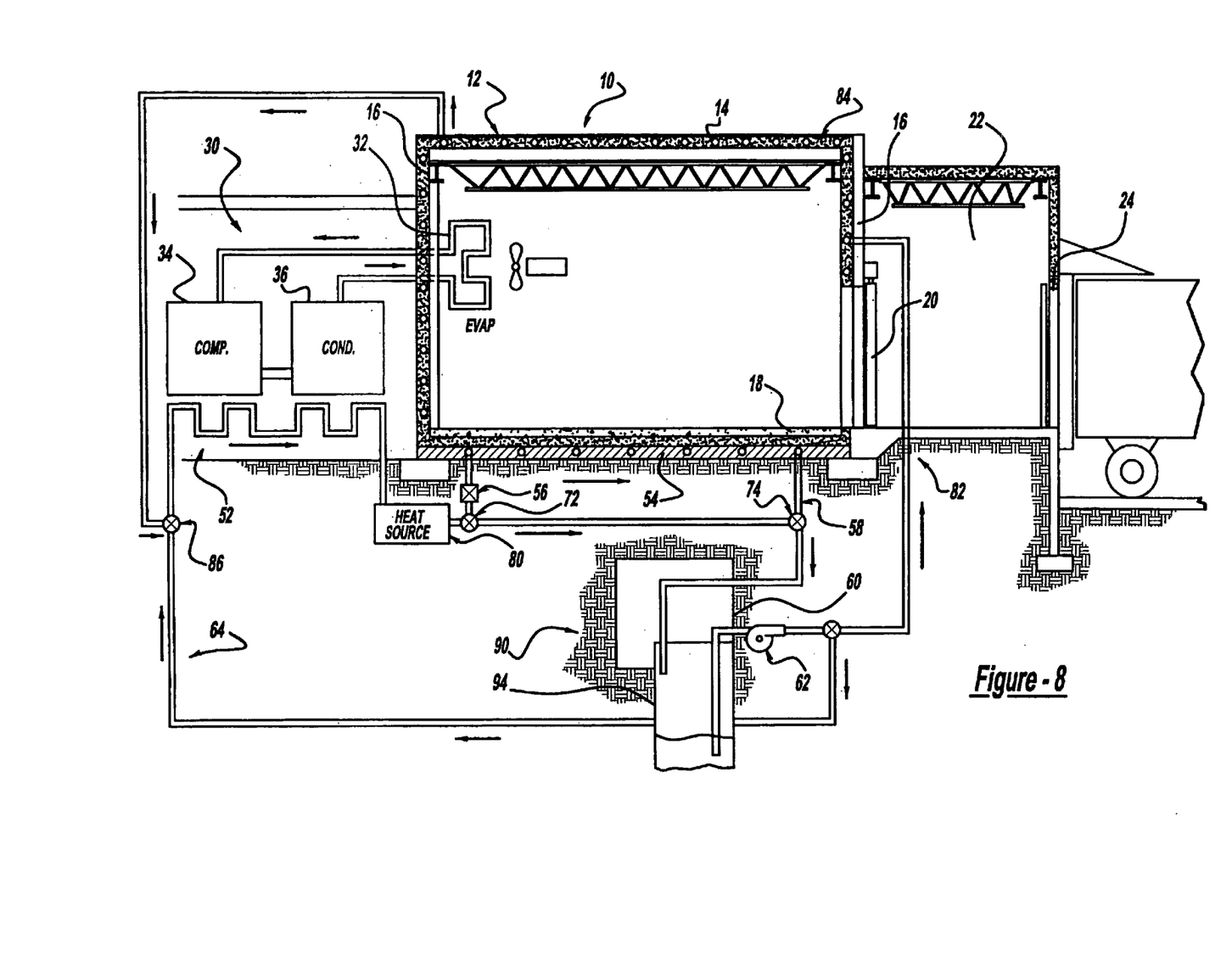
FIGS. 8 and 9 are schematic views like FIG. 5 utilizing a standing well and an open well or body of water.
Figure 9:
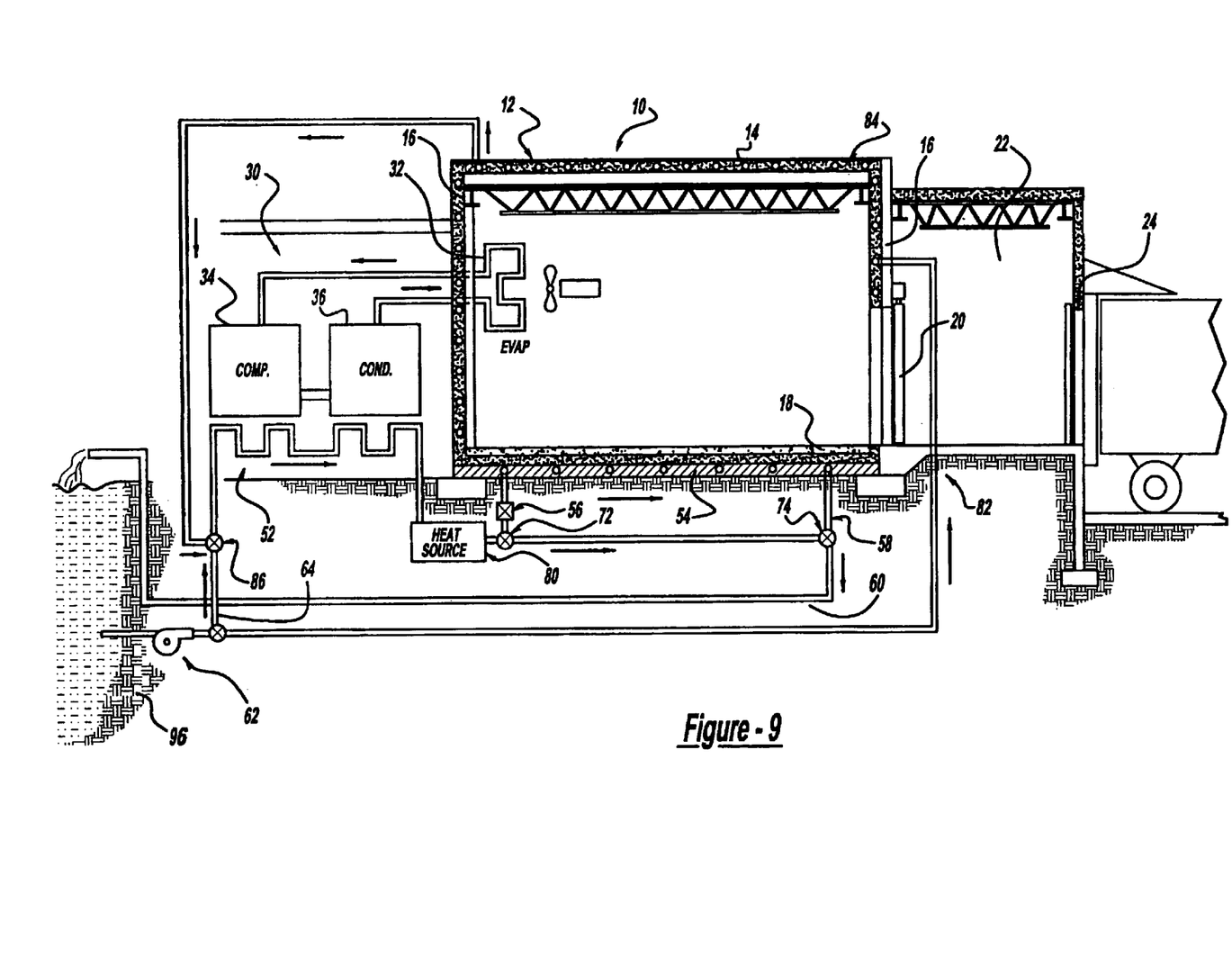

FIGS. 8 and 9 illustrate embodiments of the invention like those illustrated in FIG. 5. In FIG. 8, a standing well 94 is provided. The standing well 94 is like that described above and can be utilized in the present invention.

FIG. 9 illustrates an embodiment utilizing an open well or body of water 96. As mentioned above, though water is drawn into the system and is exited into the body of water.

Accordingly, where ground or well water is readily available, the present invention can utilize these water sources directly for the fluid utilized in the system. Also, the water is continuously refreshened and circulated into the system keeping a desired temperature to dissipate or transfer heat to the area below the floor or into the walls and roof of the building.

While the above detailed description describes the preferred embodiment of the present invention, the invention is susceptible to modification, variation, and alteration without deviating from the scope and fair meaning of the subjoined claims.

What is claimed is:

1. A cold storage facility energy transfer system, comprising:
   a building including walls, a roof, and a floor, defining an enclosed space to be cooled;
   a primary cooling system for cooling said building enclosed space;
   a fluidly separate ground water exchange mechanism for heat transfer between the ground water and said building, said ground water heat exchange mechanism including a mechanism associated with an area adjacent said building floor for maintaining said area at a temperature so that underfloor freezing and icing is eliminated.

2. The system according to claim 1, wherein said ground water heat exchange mechanism moves ground water, said water moving in close proximity with said building.

3. The system according to claim 2, wherein said water draws heat from a compressor and/or condenser of said cooling system, said water being moved into close proximity of said floor for maintaining a desired temperature under said floor.

4. The system according to claim 1, wherein said ground water heat exchange mechanism being a standing well, open well or body of water.

5. A cold storage facility energy transfer system, comprising:
   a building including walls, a roof, and a floor, defining an enclosed space to be cooled;
   a primary cooling system for cooling said building enclosed space;
   a fluidly separate ground water heat exchange mechanism for heat transfer between the ground water and said building, said ground heat exchange mechanism including a mechanism associated with an area adjacent said building walls and/or roof for maintaining said area at a temperature for reducing energy usage.

6. The system according to claim 5, wherein said ground water heat exchange mechanism moves ground water, said ground water moving in close proximity with said building.

7. The system according to claim 6, wherein said water dissipates heat from the walls and/or roof and a compressor and/or condenser of said cooling system, said water being moved into said ground water heat exchanger for dissipating heat to the ground water for maintaining a desired temperature.

8. The system according to claim 5, wherein said ground heat exchange mechanism being a standing well, open well or body of water.

9. A cold storage facility energy transfer system, comprising:
   a building including walls, a roof, and a floor, defining an enclosed space to be cooled;
   a primary cooling system including a compressor, a condenser, and an evaporator for providing cooled air for cooling said building enclosed space;
   a fluidly separate ground water heat exchange mechanism for heat transfer between the ground water and said building, said ground water heat exchange mechanism including a mechanism associated with an area adjacent said building floor and said walls and roof for maintaining said area at a desired temperature.

10. The system according to claim 9, wherein said ground water heat exchange mechanism moves ground water, said water moving in close proximity with said building.

11. The system according to claim 9, wherein said water dissipates heat from the walls and/or roof and a compressor and/or condenser of said cooling system, said water being moved into close proximity of said floor for maintaining a desired temperature under said floor, and said water being moved into said ground water heat exchanger for dissipating heat to the ground water for maintaining a desired temperature.

12. The system according to claim 9, wherein said ground water heat exchange mechanism being a standing well, open well or body of water.

\* \* \* \* \*